United States Patent [19]
Jorgensen

[11] 3,751,856
[45] Aug. 14, 1973

[54] PROFILE COPYING MACHINE
[76] Inventor: Ernest Charles Jorgensen, 148 Birtwistle Ave., Colne, England
[22] Filed: Sept. 28, 1971
[21] Appl. No.: 184,591

[52] U.S. Cl. .................................. 51/100 R, 51/99
[51] Int. Cl. ........................................... B24b 17/00
[58] Field of Search .................. 51/100 R, 99, 34 R

[56] References Cited
UNITED STATES PATENTS

| | | | |
|---|---|---|---|
| 2,675,652 | 4/1954 | Chiappulini | 51/100 R |
| 2,725,050 | 11/1955 | Jakobsen | 51/100 R X |
| 3,324,843 | 6/1967 | Koch | 51/100 R X |
| 2,990,655 | 7/1961 | Guinn | 51/99 |
| 3,040,481 | 6/1962 | De Uleig | 51/100 R |
| 3,375,613 | 4/1968 | Boucher | 51/100 UX |

FOREIGN PATENTS OR APPLICATIONS

| | | | |
|---|---|---|---|
| 622,951 | 5/1949 | Great Britain | 51/101 R UX |
| 594,902 | 11/1947 | Great Britain | 51/101 R UX |
| 696,968 | 9/1953 | Great Britain | 51/101 R UX |

Primary Examiner—Donald G. Kelly
Assistant Examiner—Howard N. Goldberg
Attorney—Stevens, Davis, Miller & Mosher

[57] ABSTRACT

A profile copying machine has a workpiece shaping tool and stylus, for following the profile of a model, mounted on a pivoted platform so that the tool and stylus have the same radius of movement. The stylus is in the form of a wheel with a radiused peripheral edge and the tool, which is in the form of a grinding wheel, has a similar edge so that the equivalent of point contact with the workpiece and model is obtained. The stylus may be adjusted towards and away from the model. The workpiece and model are mounted on a reciprocating table and the tool and stylus can progressively traverse across the reciprocating workpiece and model. The tool can be driven by an electric motor which acts as a balancing weight for the pivoted platform so that the platform has two stable positions: one position with the tool and workpiece in contact and the other position with the tool raised clear of the workpiece.

6 Claims, 7 Drawing Figures

PROFILE COPYING MACHINE

BACKGROUND OF THE INVENTION

This invention relates to profile copying machines.

Such machines have hitherto been complex and expensive in construction and operation. They normally contain many moving parts and certain types include visual projection hydraulic means for ensuring accurate working of a workpiece. Thus, they are often cumbersome in construction.

The object of the present invention is to provide a profile copying machine which is simple and compact in construction, and whose ease, and thus speed of operation is considerably increased.

SUMMARY OF THE INVENTION

According to the present invention there is provided a profile copying machine including means for locating a workpiece and a model, a stylus to follow the profile of the model and means to cause a workpiece shaping tool to follow the stylus whereby the profile of the model can be copied to form a profile on the workpiece, the machine having the following features: the stylus and tool are carried on a pivoted structure which forms a support for the stylus and tool so that they move together: the contact points of the stylus with the model and the tool with the workpiece have substantially the same radius of movement about the pivot axis of the structure: the stylus and tool are radiused to form substantially a point contact with the model and workpiece respectively: the stylus may be adjusted relative to said structure so that it can be moved towards and away from the model:

there are means to cause the workpiece and model to reciprocate together relative to the structure:

and there are means to cause the workpiece and model to traverse together relative to the structure.

BRIEF DESCRIPTION OF THE DRAWINGS

FIG. 7 is a section taken on the line VII-VII of FIG. 3, on an enlarged scale, parts being removed for clarity.

DESCRIPTION OF THE PREFERRED EMBODIMENT

Figure 1:
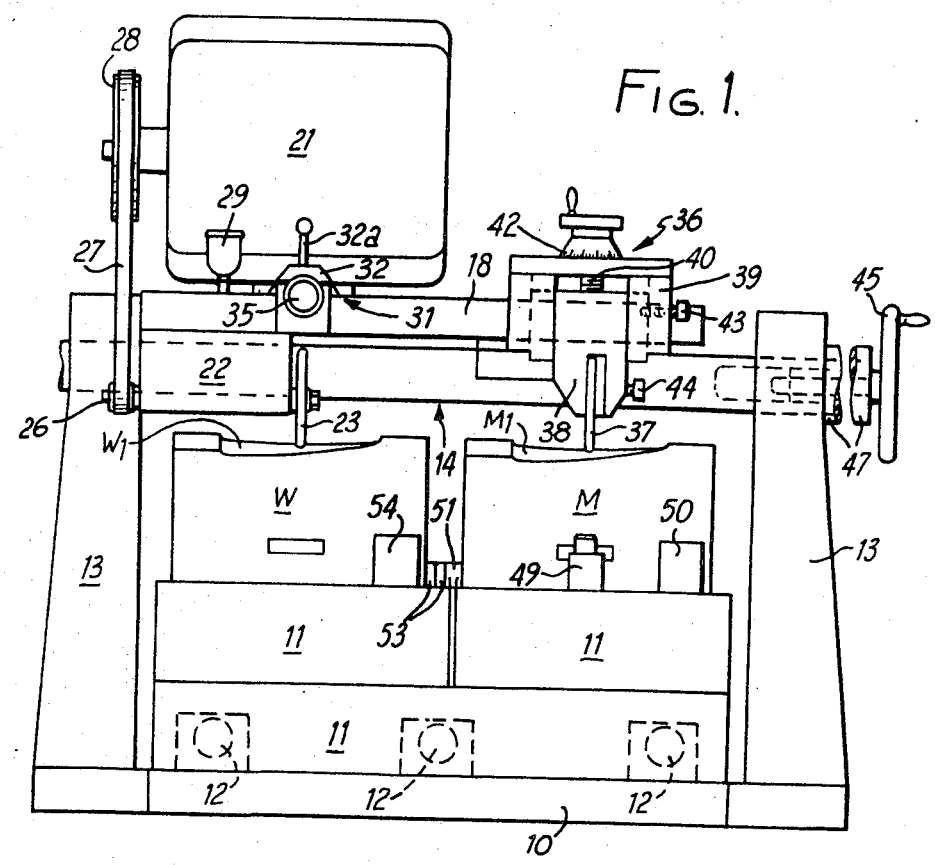
FIG. 1 is a front elevation of a profile copying machine in accordance with the invention.
Figure 2:
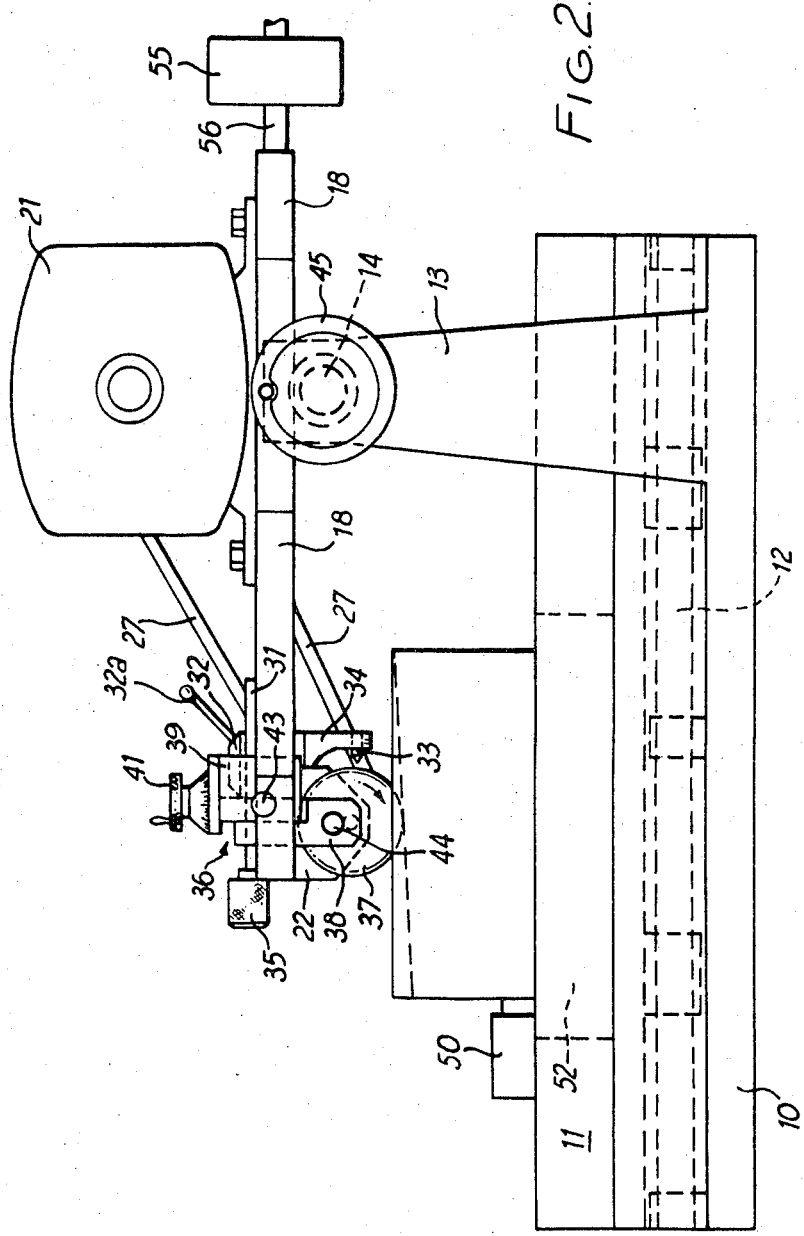
FIG. 2 is a side elevation.
Figure 3:
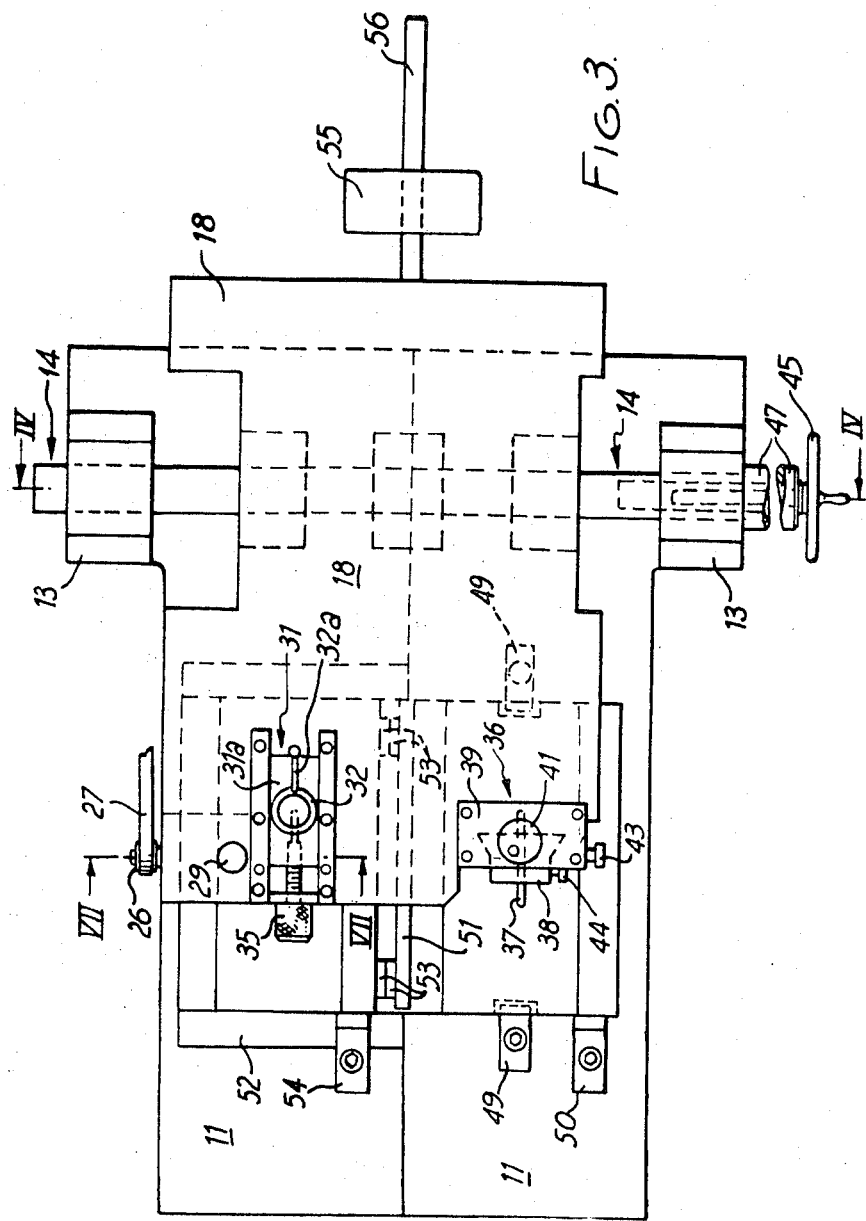
FIG. 3 is a plan view, parts being removed for clarity.
Figure 4:
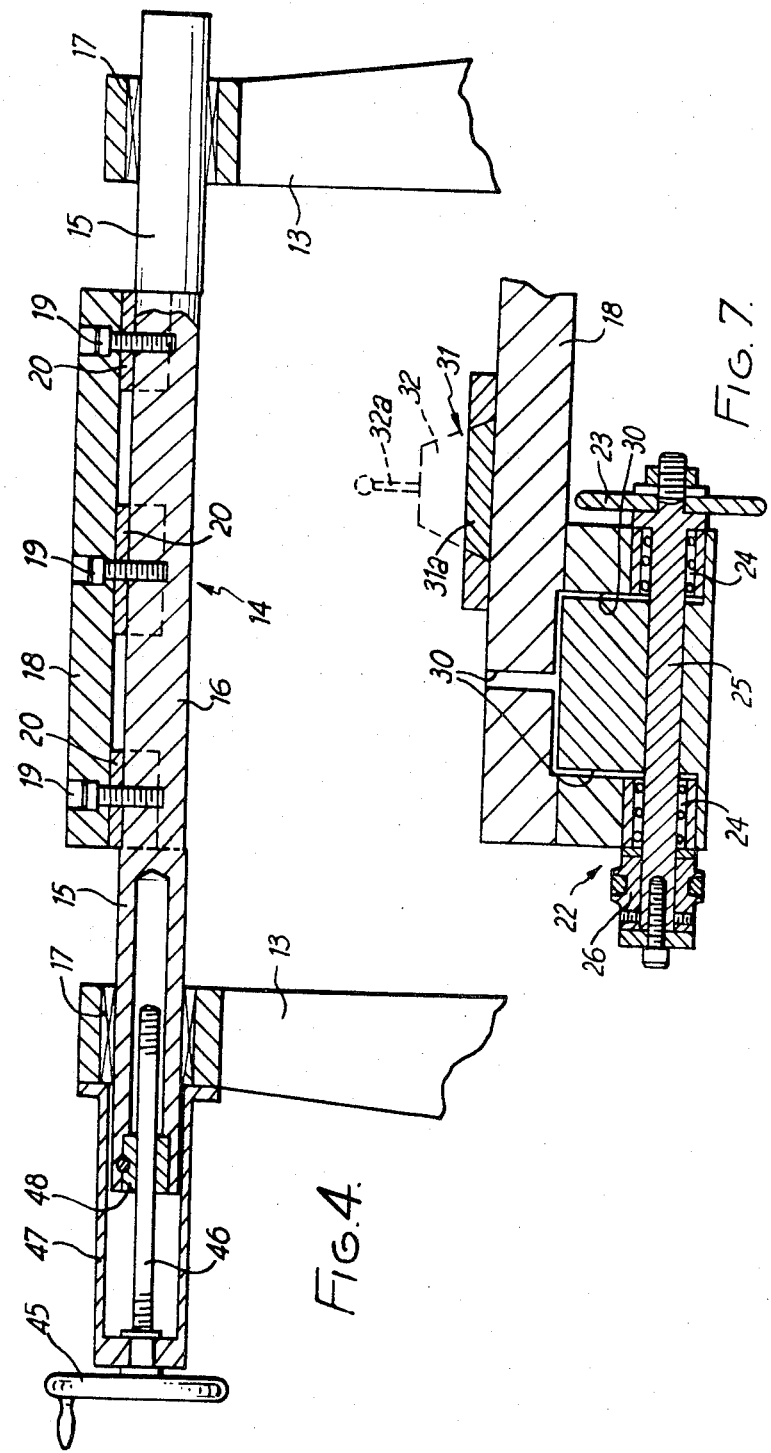
FIG. 4 is a section on a larger scale taken on the line IV—IV of FIG. 3, parts being removed for clarity.
Figure 5:
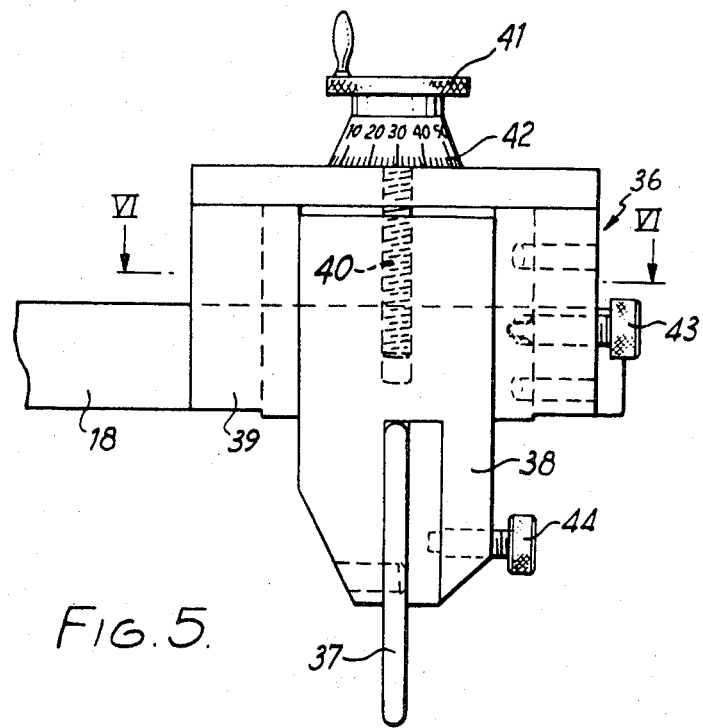
FIG. 5 is a front elevation of part of the arrangement of FIG. 1, on an enlarged scale.
Figure 6:
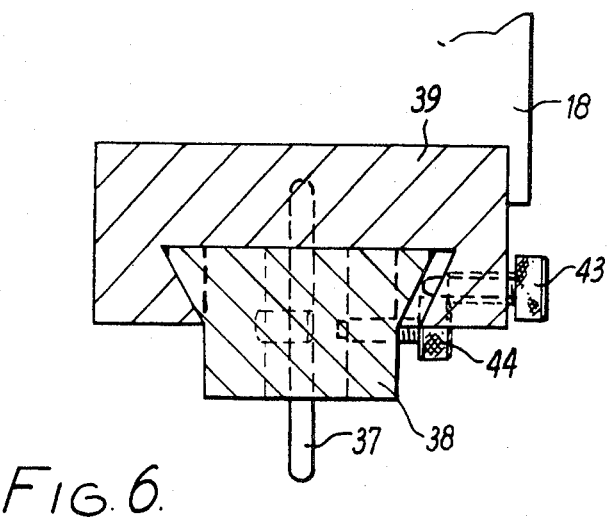
FIG. 6 is a section taken on the line VI—VI of FIG. 5.

The machine, which has a grinding wheel as the workpiece shaping tool has a base 10 and includes a reciprocating work table 11, the reciprocation being longitudinally on the base 10 by means of spaced bearings or rails 12.

Attached to the base 10 at each side of the work table 11 is an upstanding pillar 13, the free ends of the two pillars 13 being connected by a cross member 14 which thus bridges the work table 11. The cross member 14 consists of end pieces 15 and a center bridge 16, and is mounted in pivot bearings 17 on the pillars 13.

A platform 18 attached rigidly to the center bridge 16 of the cross member 14 by means of screws 19 and centering blocks 20, is arranged to pivot about the axis of the cross member 14 by virtue of the bearings 17. Mounted on the platform 18 is an electric motor 21 located above the cross member 14.

Rigidly attached to one end of the platform 18 is a grinding wheel head assembly 22, consisting of a grinding wheel 23 mounted for rotation in bearings 24. The grinding wheel 23 is attached to a shaft 25, the free end of which carries a drive pulley 26. A driving belt 27 is disposed between the pulley 26 and a further drive pulley 28 mounted on the output shaft of the motor 21.

An oil reservoir 29 is mounted above the grinding wheel head assembly 22 such that oil can flow, via a channel 30 around the bearings 24.

Also mounted on the platform 18 above the grinding wheel 23 is a dovetail slide 31, to the slider 31a of which is attached a turntable arrangement 32, having a handle 32a, which passes through the platform 18. A diamond or like cutter 33 mounted in a cutter head 34 is adjustably attached to the said arrangement below the platform 18 and adjacent the periphery of the grinding wheel 23. An adjusting screw 35 is located on the end of the platform 18 and is arranged to move the slider 31a and thus the turntable arrangement 32 to and fro along the slide 31, i.e. the diamond cutter 33 is adapted for movement towards and away from the periphery of the grinding wheel 23 for dressing it.

A stylus assembly 36, the stylus being in the form of a wheel is also mounted on the platform 18 alongside the grinding wheel head assembly 22. Thus the platform 18 forms a pivoted structure which is a support for the workpiece shaping tool and the stylus so that they move together.

The stylus assembly 36 comprises a stylus wheel 37 rotatably mounted in the slider 38 of a dovetail slide 39 attached to the platform 18. The slider 38 is mounted for vertical movement in the slide 39 by means of a control screw 40 having a hand wheel 41 and a graduated scale 42. Thus the stylus has adjustment relative to the platform 18 so that it can be moved towards and away from the model and maintained in any adjusted position by a locking screw 43.

The stylus wheel 37 consists of a disc having a radiused peripheral edge as does the grinding wheel 23 so that they form a substantially point contact with the model and workpiece respectively. The wheel 37 can be locked in any rotational position by means of a locking screw 44 so that an unworn portion of the periphery can be brought into the model contacting position.

The arrangement is such, therefore, that the grinding wheel 23 and stylus wheel 37 are arranged parallel to each other on the platform 18 and are adapted, by virtue of the pivotal mounting of the platform to pivot downwardly to rest respectively on a workpiece W and a model M mounted on the work table 11.

A hand wheel 45 is provided on the end of a threaded shaft 46 which is mounted captively in a bearing sleeve 47 attached to the upper region of one of the pillars 13. The adjacent end piece 15 of the cross member 14 includes a threaded collar 48 which co-operates with the threaded shaft 46. The other end piece 15 is slidably mounted in the upper region of the other pillar 13 so that by operating the hand wheel 45, the cross member 14 and the platform 18 mounted thereon can be traversed across the machine. Thus the grinding wheel 23 and stylus wheel 37 can be moved simultaneously respectively across the workpiece and the model, that is, the workpiece and model traverse together relative to the counterbalanced pivoted structure.

The model is clamped in position on the work table 11 by clamping means 49, against a stop member 50 and a rail 51. The workpiece is located and retained on a magnetic chuck 52 which is let into the work table 11. Slips or distance pieces 53 are provided to locate the workpiece correctly in relation to the model and a stop member 54 determines the longitudinal location of the workpiece on the work table 11.

A counterbalance weight 55 is adjustably located on a rail 56 at the end of the platform 18 remote from the grinding wheel and stylus assemblies.

In use, therefore, the model M having a preformed profile M1 is placed on the work table 11 adjacent a workpiece W, and the work table 11 is set in reciprocating longitudinal motion. The platform 18 is allowed to pivot until the stylus wheel 37 abuts the model M. Thereafter, the control screw 40 is adjusted according to its graduated scale 42 until the grinding wheel 23 abuts the workpiece W. With the arrangement as such, the hand wheel 45 is turned by a small amount for each reciprocation of the work table 11, so that the entire width of the workpiece W is gradually cut to a profile W1 equivalent to the profile M1 of the model M. That is to say, as the stylus wheel 37 rides over the surface of the model, the grinding wheel 23 moves in a similar manner to shape the workpiece.

After each shaping operation, or whenever necessary, the grinding wheel 23 can itself be re-cut by moving the adjusting screw 35 to bring the diamond cutter 33 to a position adjacent the grinding wheel 23. Then, with the latter, rotating, the turntable 32 is operated by turning the handle 32a so that the diamond cutter 33 defines an arc transversely across the periphery of the wheel 23. In this way, the grinding wheel 23 can be re-cut repeatedly so as to maintain a peripheral cross section equal to that of the stylus wheel 37.

The weight 55 is adjusted on the rail 56 in order to provide a counter weight for the major part of the platform 18 so as effectively to control the weight of the latter and thus the pressure applied to the workpiece by the grinding wheel. In order to raise the stylus wheel and the grinding wheel away from their operative position when not in use all that is necessary is for the table to be pivoted in the appropriate manner such that the weight of the motor is shifted to the other side of the pivot point with the result that the platform 18 is held against some stop member in the raised position. Thus the platform 18 has two stable positions: one where the stylus contacts the model and the other where the stylus is clear of the model, and hence the wheel 23 is clear of the workpiece so that a workpiece can be inserted or withdrawn from the machine.

It has been found that, by using the apparatus described herein, a rapid and precise grinding operation can be carried out for producing three dimensional forms such as dies for aerofoil construction.

The invention is not restricted to the details heretofore described. For example, manual operation of the hand wheel can be replaced by an automatic step-by-step feed using a ratchet adapted to be operated by the reciprocation of the work table. A dust and shaving extraction unit can be associated with the apparatus in the usual manner.

I claim:
1. A profile copying maching comprising:
   a. a base structure including a cross member;
   b. a table longitudinally reciprocable on the base structure and having means for locating a model and a workpiece;
   c. a platform on said cross member, said platform being pivotal and traversable across said table;
   d. a model stylus and a workpiece cutting tool, both having radius edges to give a point contact, carried on said platform and applying a force on the platform to pivot the platform in a direction to bring the stylus and tool into contact with the model and workpiece respectively;
   e. a first screw for controlling the vertical displacement of the stylus relative to the cutting tool; and
   f. a second screw for controlling the traverse of the platform.
2. The machine of claim 1 wherein said platform is counterbalanced in a manner such that it has two stable positions, one where the stylus contacts the model and the other where the stylus is clear of the model, wherein in the other position the workpiece cutting tool is clear of the workpiece, so that a workpiece can be inserted or withdrawn from the machine.
3. The machine of claim 1 wherein said stylus is in the form of a disc having a radiused peripheral edge, the disc being rotatable and having locking means for rendering it lockable in any rotational position so that an unworn part of the periphery can be brought to the model contacting position.
4. The machine of claim 1 wherein the workpiece cutting tool is a grinding wheel with a radiused peripheral edge, and wherein there is provided an electric motor on the platform for driving the grinding wheel.
5. The machine of claim 4 wherein the motor is so located on the platform as to provide, with an adjustable counterbalancing weight, two stable positions of said platform.
6. The machine of claim 4 having, mounted on said platform, a grinding wheel dressing cutter.

* * * * *